(12) United States Patent
Tang

(10) Patent No.: US 11,374,605 B1
(45) Date of Patent: Jun. 28, 2022

(54) SELF-DIAGNOSIS SYSTEM FOR WIRELESS TRANSCEIVERS WITH MULTIPLE ANTENNAS

(71) Applicant: NXP USA, Inc., Austin, TX (US)

(72) Inventor: Weihua Tang, Eindhoven (NL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/233,987

(22) Filed: Apr. 19, 2021

(51) Int. Cl.
   *H04B 1/38* (2015.01)
   *H04B 17/29* (2015.01)
   *H04B 17/19* (2015.01)

(52) U.S. Cl.
   CPC ............... *H04B 1/38* (2013.01); *H04B 17/19* (2015.01); *H04B 17/29* (2015.01)

(58) Field of Classification Search
   CPC ........................................................ H04B 1/38
   See application file for complete search history.

(56) References Cited

U.S. PATENT DOCUMENTS

| | | | |
|---|---|---|---|
| 6,965,756 B2 | 11/2005 | Harris et al. | |
| 2003/0067869 A1 | 4/2003 | Harris et al. | |
| 2005/0141594 A1* | 6/2005 | Smith | H04B 1/692 375/130 |
| 2006/0286941 A1* | 12/2006 | Behroozi | H04B 7/0802 455/78 |
| 2013/0225095 A1* | 8/2013 | Hong | H04B 15/00 455/73 |
| 2014/0073273 A1* | 3/2014 | Asensio | H04B 1/1607 455/114.3 |
| 2016/0088429 A1* | 3/2016 | Gao | H04W 4/029 455/456.1 |
| 2017/0067950 A1 | 3/2017 | Patel et al. | |

FOREIGN PATENT DOCUMENTS

EP       0920146 A2    6/1999

OTHER PUBLICATIONS

Debaesnt, W. et al., "RMS Delay Spread vs. Coherence Bandwidth from 5G Indoor Radio Channel Measurements at 3.5 GHz Band," Sensors, vol. 20, No. 3, p. 750, 2020.

* cited by examiner

*Primary Examiner* — Hsinchun Liao

(57) ABSTRACT

A wireless data communication radio includes a first transceiver configured to be coupled to a first antenna, and a second transceiver configured to be coupled to a second antenna. The second transceiver includes a multi-path detector. The wireless data communication radio transmits a radio signal via the first transceiver, receives the radio signal at the second transceiver, and determines, by the multi-path detector, that the radio signal, as received by the second transceiver, was transmitted by the first antenna and received by second antenna.

20 Claims, 4 Drawing Sheets

SELF-DIAGNOSIS SYSTEM FOR WIRELESS TRANSCEIVERS WITH MULTIPLE ANTENNAS

FIELD OF THE DISCLOSURE

This disclosure generally relates to wireless communication systems, and more particularly relates to providing a self-diagnosis system for wireless transceivers with multiple antennas in a wireless communication system.

BACKGROUND

The application of wireless data communication technologies is rapidly proliferating as technology pushes the need for reliable data communications to places where wired data communication systems are not practical. In particular, mobile data communication applications are widely adopted today, and, with the advent of 5G wireless technology, will become even more widely adopted in the future. Applications such as readily available WiFi and cellular technology place wireless data communication interfaces within any type of computing device imaginable. Future applications include vehicle communication systems such as vehicle-to-infrastructure (V2I) communications, vehicle-to-network (V2N) communications, vehicle-to-vehicle (V2V) communications, vehicle-to-pedestrian (V2P) communications, vehicle-to-device (V2D) communications, and vehicle-to-grid (V2G) communications, collectively referred to as vehicle-to-everything (V2X) communications. Other applications include remote sensing networks, available anywhere augmented reality applications, vehicle-based radar systems, and the like. In many such applications, the reliability of the wireless data communication interface is not merely desirable, but is safety critical. There remains a need to ensure that wireless data communication interfaces are robust and available at all times.

SUMMARY

In a first embodiment, a wireless data communication radio includes a first transceiver configured to be coupled to a first antenna, and a second transceiver configured to be coupled to a second antenna. The second transceiver includes a multi-path detector. The wireless data communication radio transmits a radio signal via the first transceiver, receives the radio signal at the second transceiver, and determines, by the multi-path detector, that the radio signal, as received by the second transceiver, was transmitted by the first antenna and received by second antenna.

In a second embodiment, a method is provided, including transmitting, by a first transceiver of a wireless data communication radio, a radio signal, wherein the first transceiver is configured to be coupled to a first antenna, receiving, by a second transceiver of the wireless data communication radio, the radio signal, and determining, by a multi-path detector of the second transceiver, that the radio signal, as received by the second transceiver, was transmitted by the first antenna and received by second antenna.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures.

Figure 1:
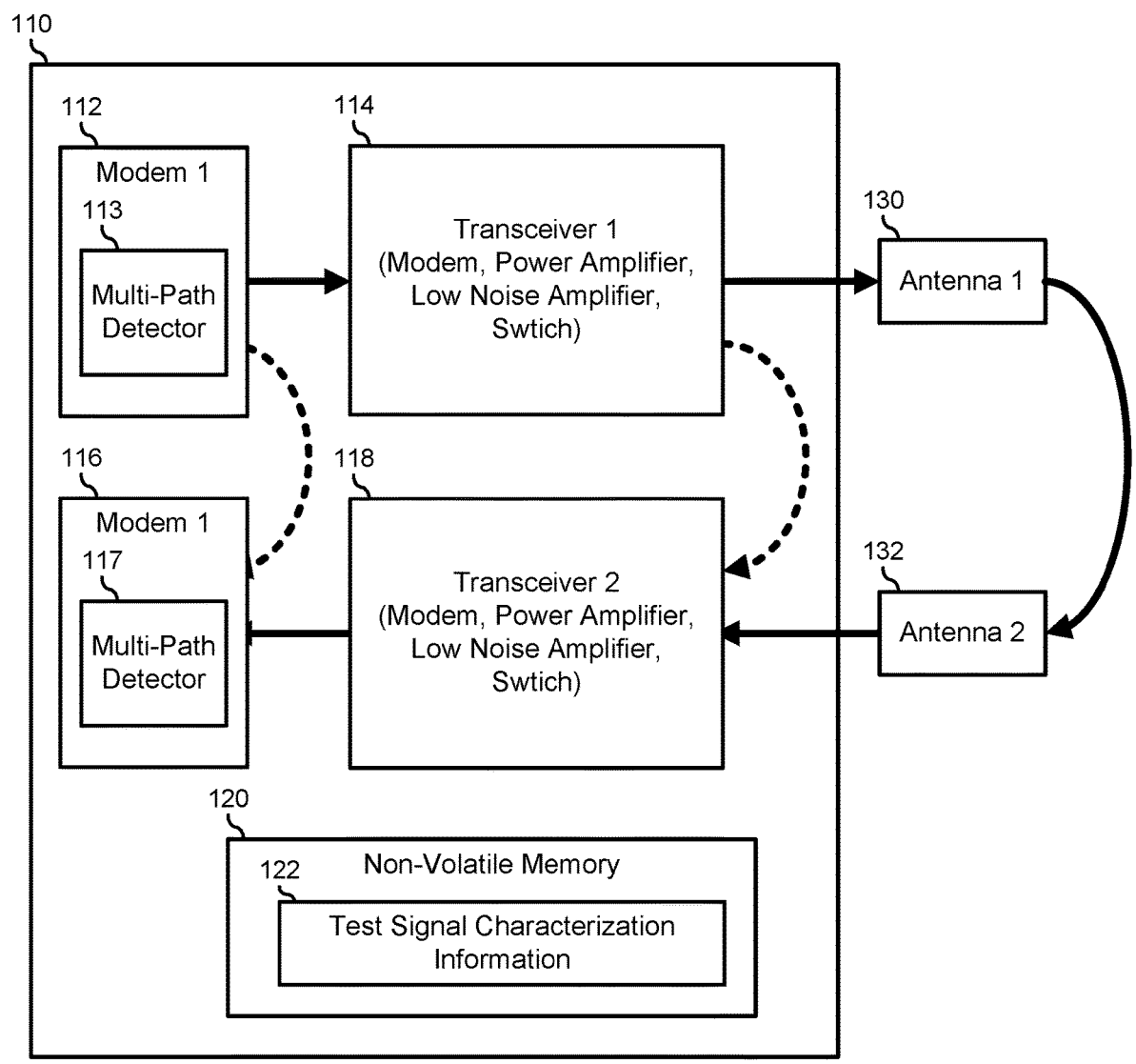
FIG. 1 is a block diagram illustrating a wireless data communication system according to an embodiment of the current disclosure.

FIG. 1 illustrates a wireless data communication system 100 including a multi-antenna wireless data communication radio 110 (hereinafter "radio") and antennas 130 and 132. Radio 110 includes a modem 112, a transceiver 114 connected to antenna 130, a modem 116, a transceiver 118 connected to antenna 132, and a non-volatile memory 120 that includes test signal characterization information 122. Wireless data communication system 100 broadly represents any type of wireless data communication system, whether in accordance with one or more industry standards, such as IEEE 802 standards, cellular communication standards, radar standards, and the like, or based upon various proprietary wireless data communication designs. As such, the teachings herein are not intended to be limited to any particular industry standard or proprietary design, but are applicable to any wireless data communication system, as needed or desired.

Modems 112 and 116 broadly represent elements of radio 110 that are configured to receive data from a particular source, and to provide the data to respective of transceivers 114 and 118 for wireless transmission to a target radio. Here, modems 112 and 116 may be understood to provide a modulating signal based upon the received data to respective transceivers 114 and 118. Modems 112 and 116 are further configured to receive data from respective transceivers 114 and 118 from a source radio, and to provide the data to a particular target. As such, modems 112 and 116 will be understood to be connected to one or more data sources, such as digital sources like a data network or the Internet, analog sources like audio or voice information, or the like. The target and source radios may be understood to be separate devices from wireless data communication system 100 where the wireless data communication system is part of a bi-directional data communication system. On the other hand, where wireless data communication system 100 represents a radar system, the wireless data communication system may be understood to represent both the source (i.e., the radar transmitter), and the target (i.e., the radar receiver).

Modems 112 and 116 include respective multi-path detectors 113 and 117, as described below.

Transceivers 114 and 118 represent radio components as are known in the art, and that are configured to receive data from respective modems 112 and 116, either as data signals or modulation signals as needed or desired, to transmit radio signals with the modulated data via antennas 130 and 132, to receive modulated radio signals via the antennas, and to provide the data from the received signals, either as data signals or as demodulated signals as needed or desired, to the modems. Transceivers 114 and 118 will be understood to be in conformance with one or more radio communication standards or proprietary designs, as needed or desired. Transceivers 114 and 118 include radio frequency (RF) components such as power amplifiers, low noise amplifiers, mixers, switches, oscillators, signal equalizers, and the like, as needed or desired. The details of wireless data communication systems, data communication radios, modems, transceivers, antennas, and the like, are known in the art, and will not be further described herein, except as needed to illustrate the current embodiments. Note that the component of radio 110 are shown as being separate, but this is not necessarily so, and radio 110 may represent a single integrated circuit device, a combination of two or more integrated circuit devices, discrete components, or the like, as needed or desired. Non-volatile memory 120 and test signal characterization information 122 will be described further below.

Reliable wireless data communication utilizing a wireless data communication system is predicated upon the proper operation of each of the elements within the wireless data communication system, including modems, transceivers, and antennas. A typical method for testing a multi-antenna wireless data communication radio is to send a test signal on one antenna, and to determine if the test signal is received by the other antennas. In particular, a test signal can be generated by a modem and provided to one of the transceivers of the radio. The selected radio then transmits the test signal via the connected antenna, and the other antennas of the radio receive the transmitted test signal, process the test signal, and return the test signal to the modem. The modem then operates to determine if the transmitted signal and the received signal are the same. If so, the radio is typically understood to be functioning properly, and the radio is typically understood to be malfunctioning only when the transmitted signal and the received signal are different.

The inventor of the current disclosure has understood that the case where the transmitted signal and the received signal are the same may not correctly indicate the absence of any problems in the data signal path. For example, FIG. 1 illustrates a test signal (solid arrows) following a signal path from modem 112 to transceiver 114, to antenna 130, to antenna 132, to transceiver 118, and back to the modem 116. However, it has been understood by the inventor of the current disclosure, that the components of radio 110 may not be well isolated electrically from each other, and that signals within one component or element of the radio may bleed into other components via improper ground isolation, cross-talk, RF emissions, improper shielding, and the like. In such cases, the transmitted signal may be picked up directly from the transmitting elements by other elements within the radio, particularly within the receiver chain. Such stray signals are illustrated by the dashed lines, where modem signals may transmitted on an output of modem 112 may be picked up by an input of modem 116, and where radio signals transmitted by one transceiver may be picked up by another transceiver of the radio. This situation is particularly acute where the level of circuit integration is high, such that the various components are very closely situated to each other. Thus, there remains a case where a transmitted test signal and the associated received test signal are the same, but the received test signal did not come from the test signal being transmitted by one antenna and received by another antenna. That is, one or more of the antenna leads may be malfunctioning, and yet the radio may detect the transmitted test signal, giving a false indication that the wireless data communication system is functioning properly.

Figure 2:
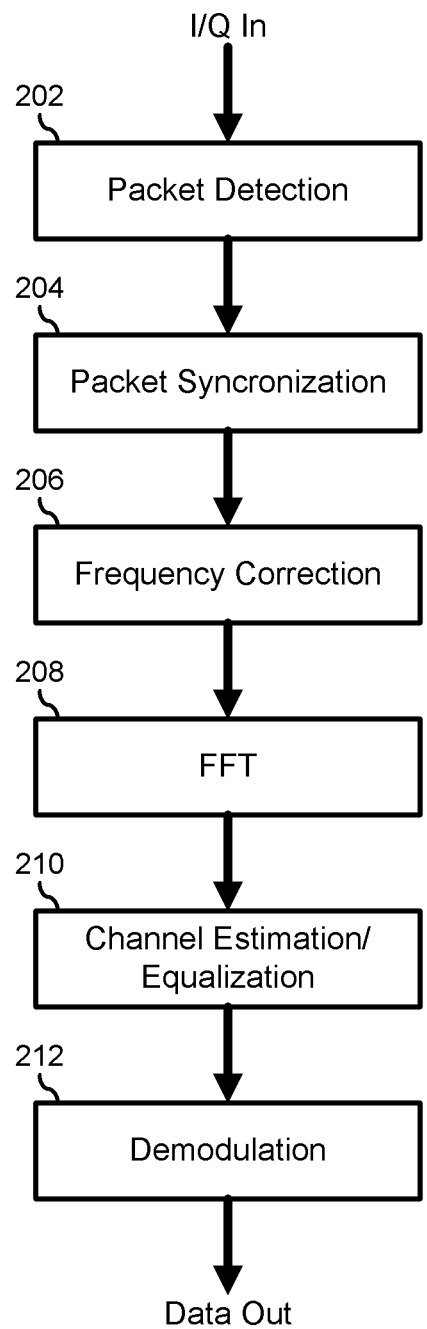
FIG. 2 is a block diagram illustrating a receiver channel in accordance with the prior art.

FIG. 2 illustrates a receiver channel 200 in accordance with the prior art. Receiver channel 200 may represent an IEEE 802.11 receiver system or another receiver system, as needed or desired. Receiver channel 200 includes packet detection 202, packet synchronization 204, frequency correction 206, Fast Fourier Transformation (FFT) 208, channel estimation and equalization 210, and packet demodulation 212. Here, an I/Q radio signal is received and the elements of receiver channel 200 operate to extract data from the I/Q radio signal. The functions and features of receiver channels and the elements thereof are known in the art, and will not be further described herein, except as needed to illustrate the current embodiments.

Figure 3:
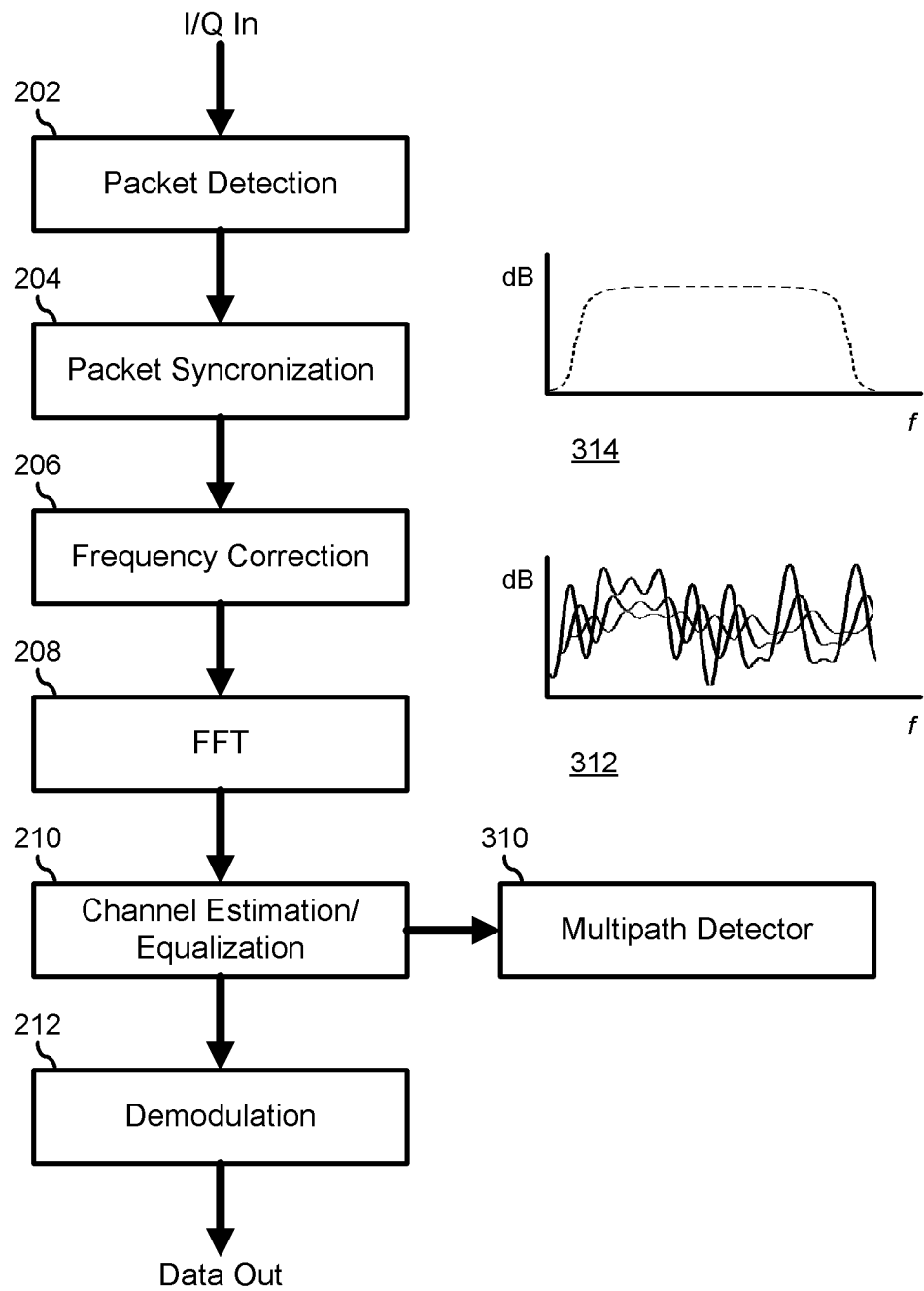
FIG. 3 is a block diagram illustrating a receiver channel according to an embodiment of the current disclosure.

FIG. 3 illustrates a receiver channel 300 in accordance with an embodiment of the current disclosure. Here, receiver channel 300 includes the elements of receiver channel 200, including packet detection 202, packet synchronization 204, frequency correction 206, FFT 208, channel estimation and equalization 210, and demodulation 212. In addition, receiver channel 300 includes a multipath detector 310 connected to channel estimation and equalization 210. It will be understood that wireless data communication channels, and in particular the transmission of the radio signal over the airwaves, results in arbitrary time dispersion, attenuation, and phase shift in the received radio signal due to the multi-path dispersion of the transmitted radio signal, as shown in the inset 312. Here, channel estimation and equalization 210 operates to form an estimate of the amplitude and phase shift introduced in the channel, and to remove the effects from the multi-path distortions from the received signal to provide a clean signal for demodulation.

It will be further understood that the signal transmitted by a wireless data communication system will have a known shape. That is, the modulation scheme utilized will result in a distinct frequency spectrum for the transmitted signal, as shown in the inset 314. For example, where a wireless data communication system utilizes an Orthogonal Frequency Division Multiplexing (OFDM) modulation, all subcarriers of the transmitted signal will have a known spectrum. It will be further understood that the wireless channel, that is, the path from the transmitting antenna to the receiving antenna, causes an arbitrary time dispersion, attenuation, and phase shift in the received signal. The OFDM signal mitigates the time dispersion effects, and the attenuation and phase shift effects are compensated for by channel estimation and equalization 210.

Multipath detector 310 operates to determine if the signal received by channel estimation and equalization 210 includes the attenuation and phase shift effects as would be expected from a signal that was transmitted by a first antenna and received by a second antenna (e.g., frequency spectrum 312), or instead if the signal received by the channel estimation and equalization is devoid of the multipath effects (e.g., frequency spectrum 314). Here, consider the OFDM case. The head of a transmitted OFDM signal includes preamble signals which transmit known data bits that are used for channel estimation. If there is no multipath effect, all subcarriers will have the same channel response, and, when comparing the received signal and the transmitted signal, the magnitude change of each subcarrier will be the same. On the other hand, if there is multipath effect in the received signal, the magnitude change over each of the different subcarriers will be different.

Returning to FIG. 1, it will be understood that multipath detectors 113 and 117 are similar to multipath detector 310, being configured to determine whether or not a received signal includes multi-path effects. In a test mode, radio 110 may be configured to send a test signal from one of modem 112 and 116 to one of transceivers 114 and 118, and to determine if a signal is received by the other transceiver and by the other modem. In a first case, no valid signal is correctly received. In this case, wireless data communication system 100 will be understood to be experiencing a fault. Such a fault may be caused by a malfunctioning component, such as modems 112 and 116, transceivers 114 or 118, or antennas 130 and 132, or by a bad connection between the components. In a second case, a valid signal is received, but the received signal does not match the transmitted signal. This condition indicates that there is another transmitter nearby that is transmitting at the same frequency, and that has caused collision with the transmitted signal. This case is expected to happen rarely, and typically will be handled by collision avoidance mechanisms as specified by the various industry standards. This condition can normally be resolved by repeating the transmitted signal, with the expectation that the colliding radio will not be broadcasting at the same time. In a third case, a valid signal is received and it matches the transmitted signal. In this case, it remains to be resolved whether or not the received signal is received via antennas 130 and 132, or via internal coupling. Here, multi-path detectors 113 and 117 operate to detect multi-path effects within the received signal, and thereby to determine that the signal was received via antennas 130 and 132, and that therefore wireless data communication system 100 is functioning normally, and to detect that no multi-path effects are present in within the received signal, and that therefore the wireless data communication system is not functioning normally.

In a particular embodiment, the detection of multi-path effects by multi-path detectors 113 and 117 is provided based upon a test signal that is transmitted during a system self-test operation initiated by radio 110. In particular, where wireless data communication system 100 represents a bi-directional wireless data communication system, the self-test mode would not represent typical operation where one antenna is expected to transmit a signal for reception by another antenna of the wireless data communication system. As such, a system self-test operation would be employed to provide the functions and features of multi-path effect detection as described herein. In another embodiment, the detection of multi-path effects by multi-path detectors 113 and 117 is provided based upon signals received in the normal course of operation of wireless data communication system 100. In particular, where wireless data communication system 100 represents a radar system, the normal operational mode would be for one antenna to transmit a signal and for another antenna to receive the transmitted signal. Here, the functions and features of multi-path effect detection as described herein can be provided on a continuous basis, such that faults are detected when they occur. In another embodiment, the internal signal coupling of radio 110 is determined by a characterization step, such as during a design or manufacturing phase of the radio. Here, one or more of the antennas can be disconnected, and a test signal can be generated. Then the received signal can be recorded. Here, any received signal will be understood to be an internally coupled signal, and any such test signal characterization information 122 of the internally coupled signal can be stored to non-volatile memory 120 for use later in determining if the received signal matches the test signal characterization information, and thereby definitively determining that a received signal is an internally coupled signal.

There is one important thing to consider when designing such a diagnostic system as described herein. The flatness of the channel response is indicated by the coherent bandwidth of the transmitted signal, which is determined by the environment and the delay profiles of the various transmission paths. Thus, the longer the root mean square of the delay spread, the smaller the coherent bandwidth. As such, when choosing a diagnostic signal, it is important to consider the environment where the radio system will be placed and select a signal which has wider spectrum than the corresponding coherent bandwidth. For example, it has been understood that the coherent bandwidths of various indoor scenarios vary between 5.8 Megahertz (MHz) to 13.4 MHz. Therefore, if a transceiver is expected to work in an indoor environment, it may be better to use a diagnostic signal with more than a 20 MHz spectrum or greater. In the outdoor case, the RMS of delay spread will be much longer than the indoor case, so the coherent bandwidth may be much smaller accordingly.

Figure 4:
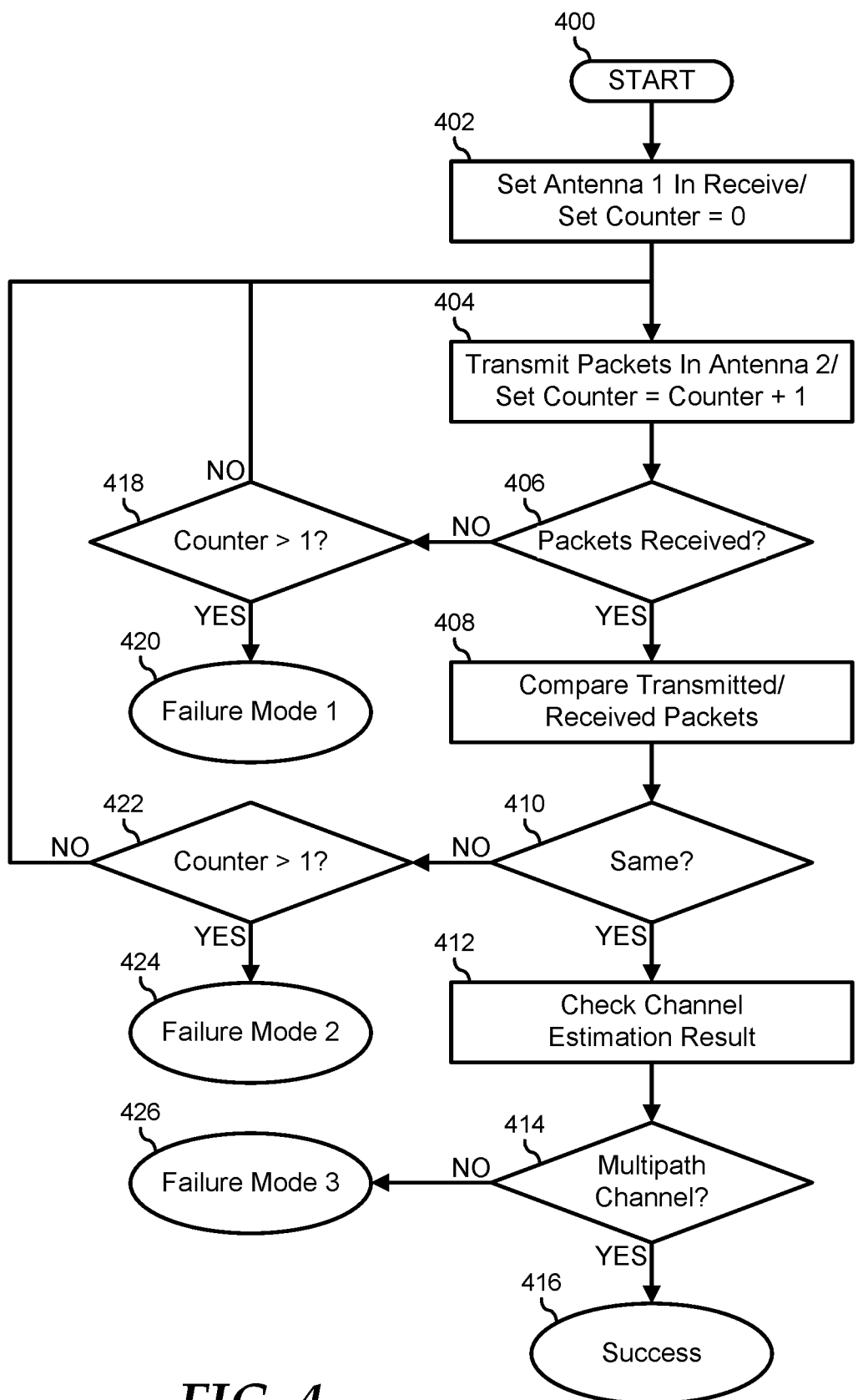
FIG. 4 is a flowchart illustrating a method for determining if a wireless data communication system is functioning normally according to an embodiment of the current disclosure.

FIG. 4 illustrates a method for determining if a wireless data communication system is functioning normally, starting at block 400. An antenna of the wireless data communication radio is set to a receive mode and a counter is set to zero (0) in block 402, and a known signal is transmitted by another antenna and the counter is incremented by one (1) in block 404. A determination is made as to whether or not a signal was received in decision block 406. If not, the "NO" branch of decision block 406 is taken and a decision is made as to whether or not the counter value is greater than one (1) in decision block 418. If not, the "NO" branch of decision block 418 is taken and the method returns to block 404 where the counter is incremented and the known signal is retransmitted. If the counter is greater than one (1), the "YES" branch of decision block 418 is taken and the first failure mode 420 is detected, where no signal is being received by the wireless data communication system.

Returning to decision block 406, if a signal was received, the "YES" branch is taken, the received signal is compared with the transmitted signal in block 408, and a determination is made as to whether or not the receive signal is the same as the transmitted signal in decision block 410. If not, the "NO" branch of decision block 410 is taken and a decision is made as to whether or not the counter value is greater than one (1) in decision block 422. If not, the "NO" branch of decision block 422 is taken and the method returns to block 404 where the counter is incremented and the known signal is retransmitted. If the counter is greater than one (1), the "YES" branch of decision block 422 is taken and the second failure mode 424 is detected, where the received signal is due to a collision.

Returning to decision block 410, if the received signal and the transmitted signal are the same, the "YES" branch is taken, the channel estimation result is checked in block 412, and a determination is made as to whether or not the receive signal is the result of a multi-path channel in decision block 414. If not, the "NO" branch of decision block 410 is taken and the third failure mode 426 is detected, where the received signal is due to internal coupling. If the receive signal is the result of a multi-path channel, the "YES"

branch of decision block 414 is taken and the wireless data communication system is determined to have successfully received the transmitted signal via the airwaves in block 416.

In a first embodiment, a wireless data communication radio may include a first transceiver configured to be coupled to a first antenna, a second transceiver configured to be coupled to a second antenna, and a multi-path detector. The wireless data communication radio may transmit a radio signal via the first transceiver, receive the radio signal at the second transceiver, and determine, by the multi-path detector, that the radio signal, as received by the second transceiver, was transmitted by the first antenna and received by second antenna.

The multi-path detector may compare the radio signal as transmitted by the first transceiver to the radio signal as received by the second transceiver to determine that the radio signal was transmitted via the first antenna and received by the second antenna. The multi-path detector may determine that the radio signal as received by the second transceiver exhibits multi-path transmission effects induced into the radio signal as a result of being transmitted from the first antenna to the second antenna. The multi-path detector may determine that the radio signal, as received by the second transceiver, was not transmitted by the first antenna and received by second antenna. The determination that the radio signal was not transmitted via the first antenna and received by the second antenna may be based upon the comparison of the radio signal as transmitted by the first transceiver to the radio signal as received by the second transceiver by the multi-path detector. The wireless data communication may further provide a fault indication in response to determining that the radio signal was not transmitted by the first antenna and received by second antenna.

The multi-path detector may compare the radio signal as received by the second transceiver to a predefined radio signal. The wireless data communication radio may further include a non-volatile memory configured to store the predefined radio signal. The wireless data communication radio may operate in a characterization mode where the predefined signal is provided from the first transceiver to the second transceiver without the first transceiver being coupled to the first antenna, and without the second transceiver being coupled to the second antenna. The predefined radio signal may be stored to the non-volatile memory in response to the operation of the characterization mode.

In a second embodiment, a method is provided for transmitting, by a first transceiver of a wireless data communication radio, a radio signal, wherein the first transceiver is configured to be coupled to a first antenna, receiving, by a second transceiver of the wireless data communication radio, the radio signal, and determining, by a multi-path detector of the second transceiver, that the radio signal, as received by the second transceiver, was transmitted by the first antenna and received by second antenna.

In determining that the radio signal was transmitted via the first antenna and received by the second antenna, the method further include comparing, by the multi-path detector, the radio signal as transmitted by the first transceiver to the radio signal as received by the second transceiver. In comparing the radio signal as transmitted by the first transceiver to the radio signal as received by the second transceiver, the method may further include determining, by the multi-path detector, that the radio signal as received by the second transceiver exhibits multi-path transmission effects induced into the radio signal as a result of being transmitted from the first antenna to the second antenna. The method may further include determining, by the multi-path detector, that the radio signal, as received by the second transceiver, was not transmitted by the first antenna and received by second antenna. The determining that the radio signal was not transmitted via the first antenna and received by the second antenna may be based upon the comparison of the radio signal as transmitted by the first transceiver to the radio signal as received by the second transceiver by the multi-path detector. The method may further include providing, by the wireless data communication radio is further, a fault indication in response to determining that the radio signal was not transmitted by the first antenna and received by second antenna.

In determining that the radio signal was transmitted via the first antenna and received by the second antenna, the method may further include comparing, by the multi-path detector, the radio signal as received by the second transceiver to a predefined radio signal. The wireless data communication radio further includes a non-volatile memory configured to store the predefined radio signal. The method may further include providing, in a characterization mode of the wireless data communication radio, the predefined signal from the first transceiver to the second transceiver without the first transceiver being coupled to the first antenna, and without the second transceiver being coupled to the second antenna. The method may further include storing the predefined radio signal to the non-volatile memory in response to the operation of the characterization mode.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless data communication radio, comprising:
   a first transceiver configured to be coupled to a first antenna;
   a second transceiver configured to be coupled to a second antenna; and
   a multi-path detector;
   wherein the wireless data communication radio is configured to:
      transmit a radio signal via the first transceiver;
      receive the radio signal at the second transceiver; and
      determine, by the multi-path detector, that the radio signal, as received by the second transceiver, was transmitted by the first antenna and received by second antenna, and
      wherein the multi-path detector is configured to compare the radio signal as transmitted by the first transceiver to the radio signal as received by the second transceiver, and the multi-path detector is further configured to determine that the radio signal as received by the second transceiver exhibits multi-path transmission effects induced into the radio signal as a result of being transmitted from the first antenna to the second antenna.

2. The wireless data communication radio of claim 1, wherein the wireless data communication radio is further configured to determine, by the multi-path detector, that the radio signal, as received by the second transceiver, was not transmitted by the first antenna and received by second antenna.

3. The wireless data communication radio of claim 2, wherein the determining that the radio signal was not transmitted via the first antenna and received by the second antenna is based upon the comparison of the radio signal as transmitted by the first transceiver to the radio signal as received by the second transceiver by the multi-path detector.

4. The wireless data communication radio of claim 3, wherein the wireless data communication radio is further configured to provide a fault indication in response to determining that the radio signal was not transmitted by the first antenna and received by second antenna.

5. The wireless data communication radio of claim 1, wherein, in determining that the radio signal was transmitted via the first antenna and received by the second antenna, the multi-path detector is configured to compare the radio signal as received by the second transceiver to test signal information.

6. The wireless data communication radio of claim 5, further comprising:
a non-volatile memory configured to store a predefined radio signal.

7. The wireless data communication radio of claim 6, wherein in a characterization mode, the predefined radio signal is provided from the first transceiver to the second transceiver without the first transceiver being coupled to the first antenna, and without the second transceiver being coupled to the second antenna.

8. The wireless data communication radio of claim 7, wherein the predefined radio signal is stored to the non-volatile memory in response to operating in the characterization mode.

9. A method, comprising:
transmitting, by a first transceiver of a wireless data communication radio, a radio signal, wherein the first transceiver is configured to be coupled to a first antenna;
receiving, by a second transceiver of the wireless data communication radio, the radio signal; and
determining, by a multi-path detector of the second transceiver, that the radio signal, as received by the second transceiver, was transmitted by the first antenna and received by second antenna, and
wherein comparing, by the multi-path detector, the radio signal as transmitted by the first transceiver to the radio signal as received by the second transceiver, and determining, by the multi-path detector, that the radio signal as received by the second transceiver exhibits multi-path transmission effects induced into the radio signal as a result of being transmitted from the first antenna to the second antenna.

10. The method of claim 9, further comprising:
determining, by the multi-path detector, that the radio signal, as received by the second transceiver, was not transmitted by the first antenna and received by second antenna.

11. The method of claim 10, wherein the determining that the radio signal was not transmitted via the first antenna and received by the second antenna is based upon the comparison of the radio signal as transmitted by the first transceiver to the radio signal as received by the second transceiver by the multi-path detector.

12. The method of claim 11, further comprising:
providing, by the wireless data communication radio is further, a fault indication in response to determining that the radio signal was not transmitted by the first antenna and received by second antenna.

13. The method of claim 9, wherein, in determining that the radio signal was transmitted via the first antenna and received by the second antenna, the method further comprises:
comparing, by the multi-path detector, the radio signal as received by the second transceiver to a test signal information.

14. The method of claim 13, wherein the wireless data communication radio further includes a non-volatile memory configured to store a predefined radio signal.

15. The method of claim 14, further comprising:
providing, in a characterization mode of the wireless data communication radio, the predefined radio signal from the first transceiver to the second transceiver without the first transceiver being coupled to the first antenna, and without the second transceiver being coupled to the second antenna.

16. The method of claim 15, further comprising:
storing the predefined radio signal to the non-volatile memory in response to operating in the characterization mode.

17. A method, comprising:
transmitting, by a first transceiver of a wireless data communication radio, a radio signal, wherein the first transceiver is configured to be coupled to a first antenna, the wireless data communication radio further includes a non-volatile memory configured to store a predefined radio signal;
receiving, by a second transceiver of the wireless data communication radio, the radio signal;
determining, by a multi-path detector of the second transceiver, that the radio signal, as received by the second transceiver, was transmitted by the first antenna and received by second antenna, and wherein comparing, by the multi-path detector, the radio signal as received by the second transceiver to a test signal information; and
providing, in a characterization mode of the wireless data communication radio, the predefined radio signal from the first transceiver to the second transceiver without the first transceiver being coupled to the first antenna, and without the second transceiver being coupled to the second antenna.

18. The method of claim 17, further comprising:
determining, by the multi-path detector, that the radio signal, as received by the second transceiver, was not transmitted by the first antenna and received by second antenna.

19. The method of claim 18, wherein the determining that the radio signal was not transmitted via the first antenna and received by the second antenna is based upon the comparison of the radio signal as transmitted by the first transceiver to the radio signal as received by the second transceiver by the multi-path detector.

20. The method of claim 19, further comprising:
providing, by the wireless data communication radio is further, a fault indication in response to determining that the radio signal was not transmitted by the first antenna and received by second antenna.

\* \* \* \* \*